INVENTOR
F. A. SAAL
BY R. O. Nimtz
ATTORNEY

Jan. 28, 1969 F. A. SAAL 3,424,868

COMBINED TIME DIVISION AND SPACE DIVISION SWITCHING SYSTEM USING PULSE CODED SIGNALS

Filed Oct. 7, 1964 Sheet 3 of 10

United States Patent Office 3,424,868

Patented Jan. 28, 1969

3,424,868

COMBINED TIME DIVISION AND SPACE DIVISION SWITCHING SYSTEM USING PULSE CODED SIGNALS

Frederick A. Saal, Plainfield, N.J., assignor to Bell Telephone Laboratories, Incorporated, New York, N.Y., a corporation of New York Filed Oct. 7, 1964, Ser. No. 402,110

U.S. Cl. 179—15 8 Claims

Int. Cl. H04j 3/10

ABSTRACT OF THE DISCLOSURE

This disclosure discusses an improved time assignment speech interpolation (TASI) system. This improved system is arranged in stages including time division and space division switching stages. The major advantages of the disclosed apparatus are freedom from crosstalk coupled with an increase in the capacity of TASI systems achieved without increasing the rate of gate operation nor decreasing the length of time slot. Thus it is possible to rely on circuits and components designed for existing, lower capacity systems.

Figure 1A:
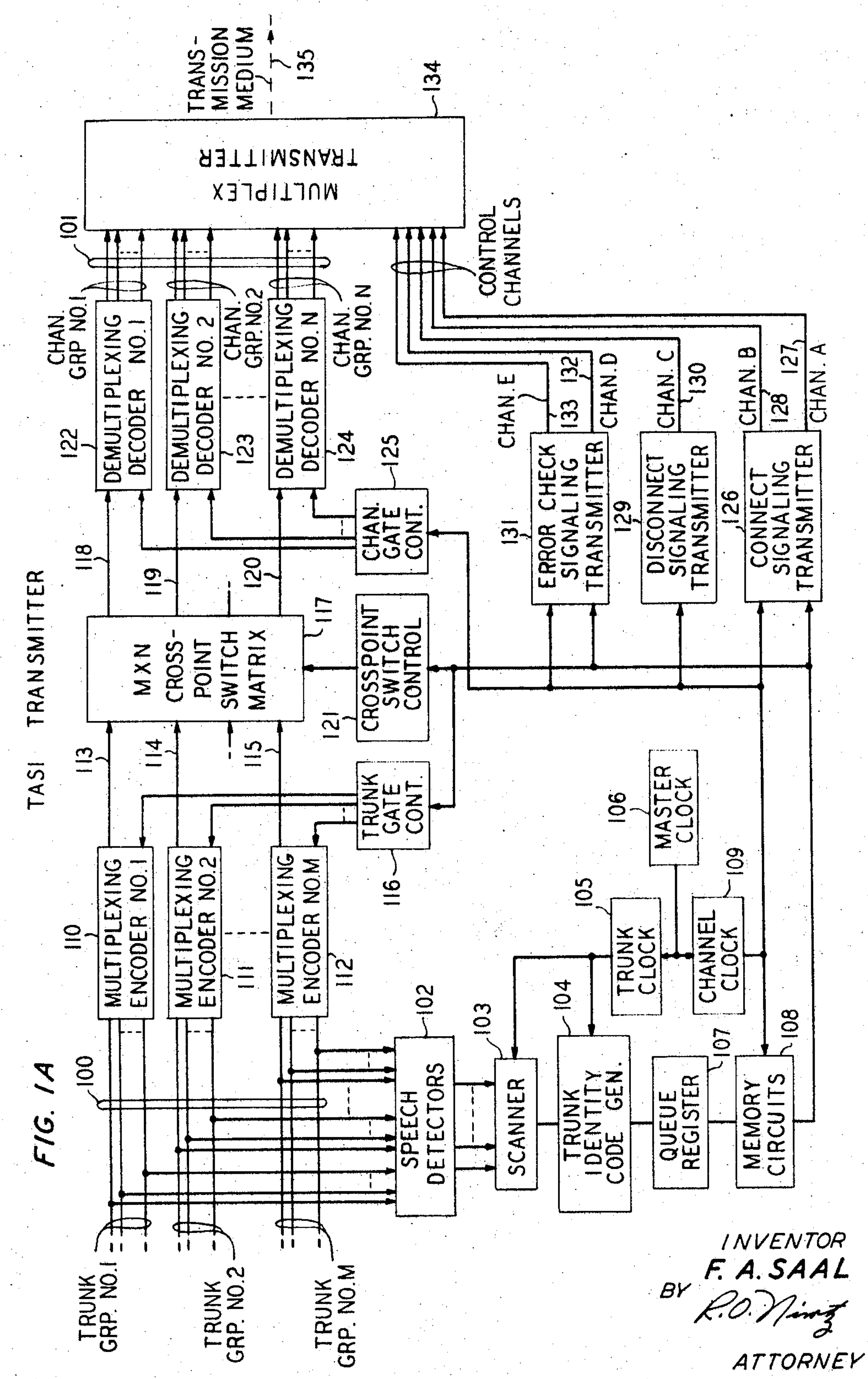

This invention relates to electronic switching systems and, more particularly, to switching arrangements for time assignment speech interpolation systems.

The economic use of expensive transmission facilities such as submarine cable or satellite communication channels dictates the full use of available channel time. To this end, various systems have therefore been proposed to take advantage of the statistical characteristics of human speech. It has been determined, for example, that, on the average, a telephone conversation makes use of the transmission facilities in one direction for less than forty percent of the time. The remaining sixty percent of the time is taken up in listening to the other party and in the normal pauses which occur in human speech. The advent of fast-acting electronic switching elements has made it possible to connect each party to the transmission facilities only when he is actually uttering speech sounds, and to disconnect him from the facilities when he is silent, thus making the facilities available for another active speaker. In this way, up to two and one-half times as many conversations can be handled by the same transmission facilities with a corresponding saving in unrequired transmission facilities. The terminal switching arrangements which perform the connection and disconnection function have been termed time assignment speech interpolation or "TASI" systems.

It has further been determined that large savings in switching apparatus are made possible by utilizing the principles of time division switching to make the actual connections. That is, rather than providing a separate switch between each input speech trunk and each outgoing transmission channel, each trunk and each channel is provided with only one gate connecting it to a common time division bus. The simultaneous closure of one trunk gate and one channel gate permits the transmission of an amplitude modulated pulse sample from the trunk to the channel. If such samples are delivered at a rate equal to at least twice the highest frequency of the input signal, the complete input signal can be reconstructed from the sample by means of a simple low-pass filter. Moreover, if the sampling interval is made very short, samples can be transmitted between other pairs of trunk-channel gates in the interval between successive samples for the first pair.

It will be appreciated that the ratio of speech trunks to transmission channels in a TASI system can be made to approach more closely the theoretical maximum when larger numbers of channels are combined in a single system. That is, the quality of speech transmission, as measured by the probability that a channel will always be available when a speaker begins to speak, is increased by increasing the total number of channels. The speed of available time division switching systems, however, is somewhat limited. The availability of sufficiently fast-operating switches, for example, limits the speed of operation. Moreover, such switches must not only be fast operating, but must also be capable of transmitting pulse samples with little or no amplitude distortion.

An even more serious problem in large capacity, higher repetition rate time division switching systems is that of crosstalk. That is, energy from each sample is stored in parasitic capacitances coupled to the common bus and appears as a distortion of the amplitude of succeeding pulse samples. Attempts to limit this source of crosstalk by means of bus clamping between samples and resonant transfer techniques have heretofore met with limited success.

It is therefore an object of the present invention to increase the capacity of time division switching systems without significant degradation of the transmitted speech.

It is a more specific object of the invention to increase the capacity of a time division switching arrangement without increasing the switching frequency or reducing the time slot length.

In accordance with the present invention, a switching system is arranged in stages including both time division and space division switching stages. The speech trunks and the transmission channels are divided into groups. Each member of a group may be switched by time division techniques to a common bus individual to that group. The common buses of the individual groups then form the vertical and lateral conductors of a space-division crosspoint switching matrix, the speech trunk group buses forming one set of conductors and the transmission channel group buses forming the other set of conductors. A crosspoint switch connects each member of one set to each member of the other set. A communication path between a speech trunk and a transmission channel is then obtained by simultaneously closing the trunk gate to the trunk group bus, the channel gate to the channel group bus, and the crosspoint switch connecting these two group buses. Other connections can be simultaneously set up through other group buses and other crosspoints.

In further accord with the present invention, crosstalk is virtually eliminated by encoding each amplitude sample on the trunk group buses in a permutation pulse group code. It is well known that pulse coded signals are virtually immune to crosstalk since only two amplitude levels need be distinguished. Moreover, such pulse codes may be switched in the crosspoint matrix with simple pulse gates. The pulse codes are, of course, decoded by means of decoders in the channel group buses to provide amplitude modulated samples for the channel gates.

The major advantage of the arrangements of the present invention is the possibility of greatly increasing the capacity of switching systems which are essentially time division systems, and yet without increasing the rate of gate operation nor decreasing the length of each time slot. For this reason, it is possible to increase the capacity of a system while relying on circuits and components designed for existing, lower capacity systems.

These and other objects and features, the nature of the present invention and its various advantages, will be more readily understood upon consideration of the attached drawings and the following detailed description of the drawings.

Figure 1B:
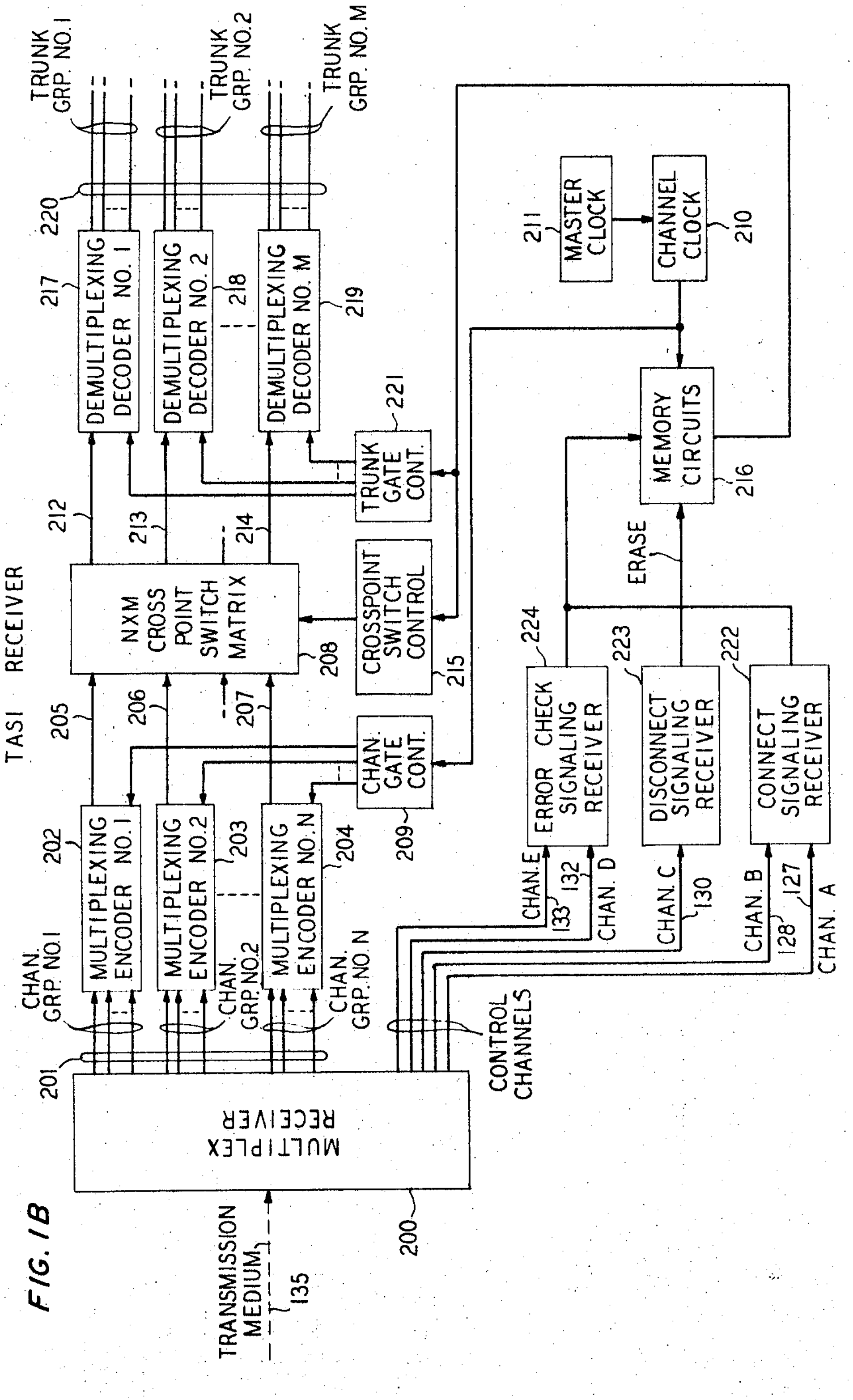

In the drawings:

FIGS. 1A and 1B, when arranged as shown in FIG.

Figure 2A:
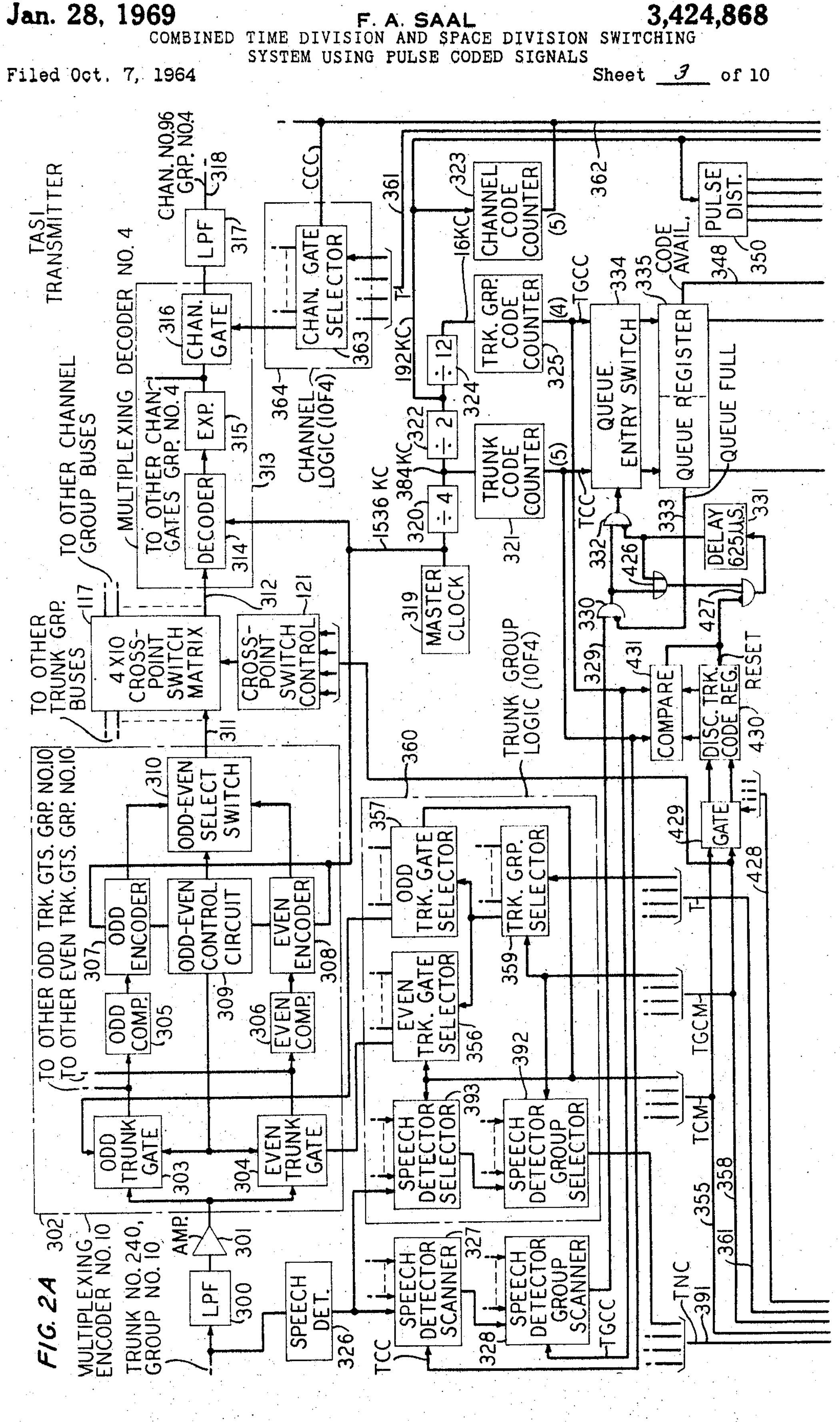
Figure 2B:
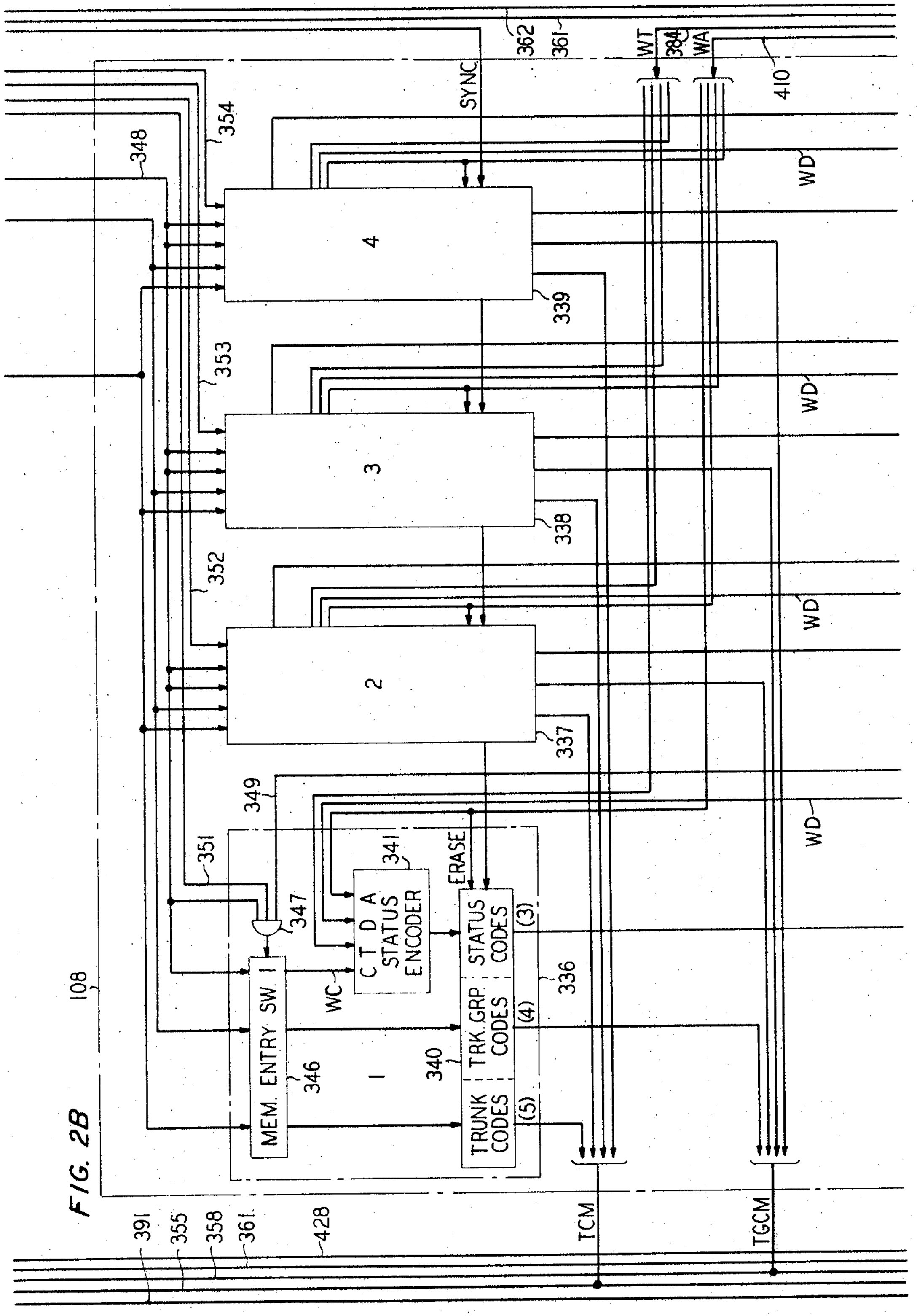
Figure 2C:
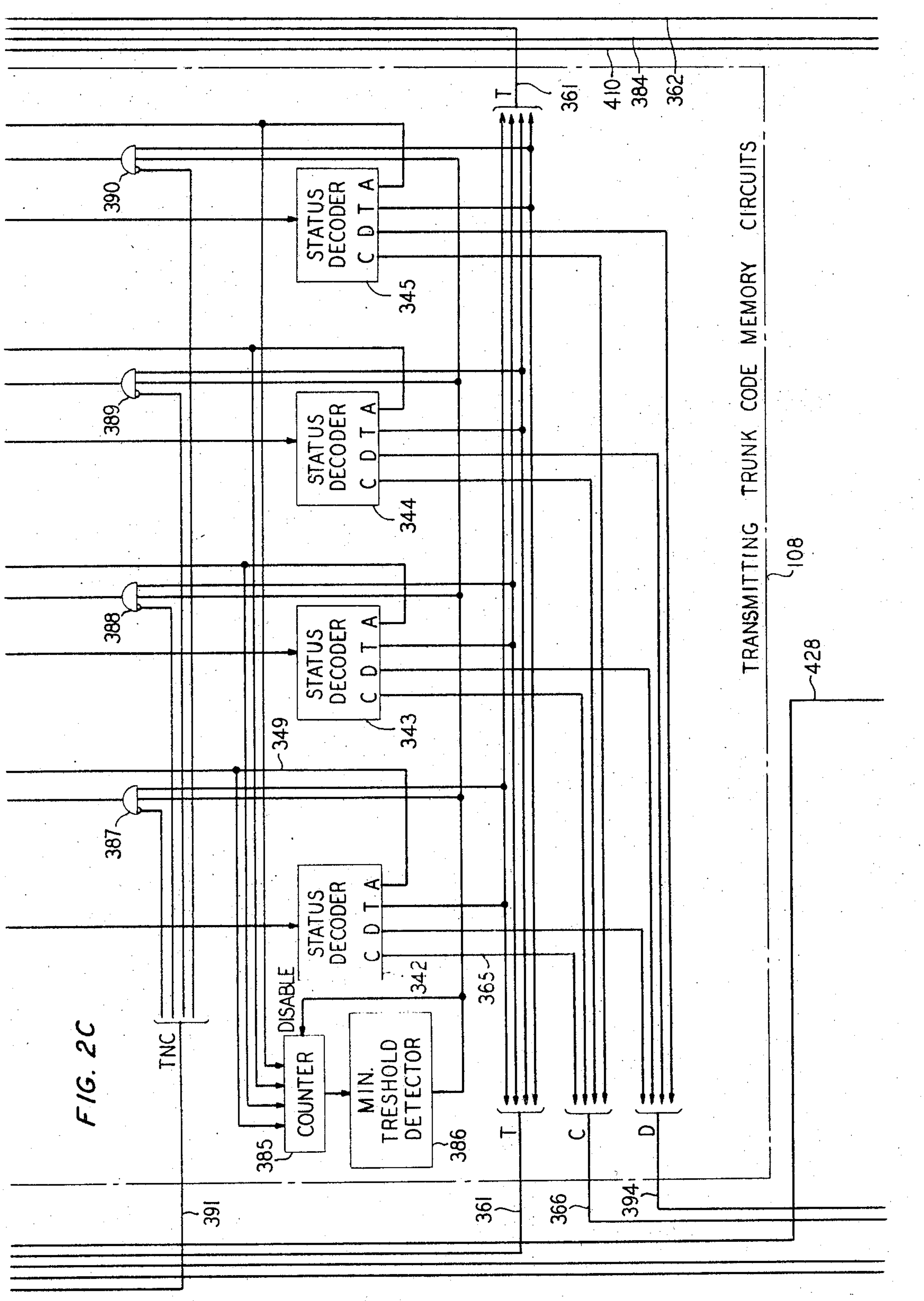
Figure 2D:
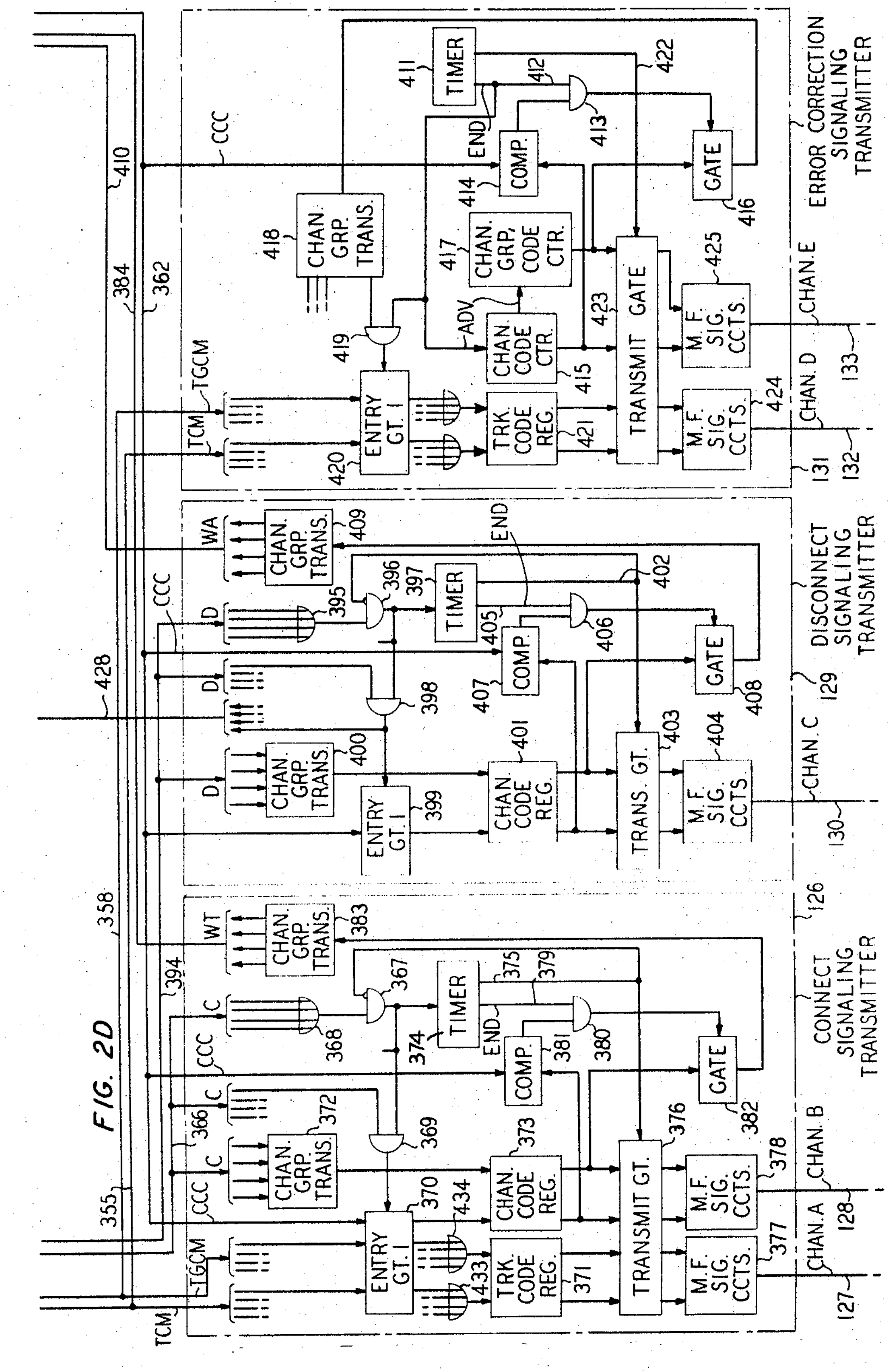
Figure 3A:
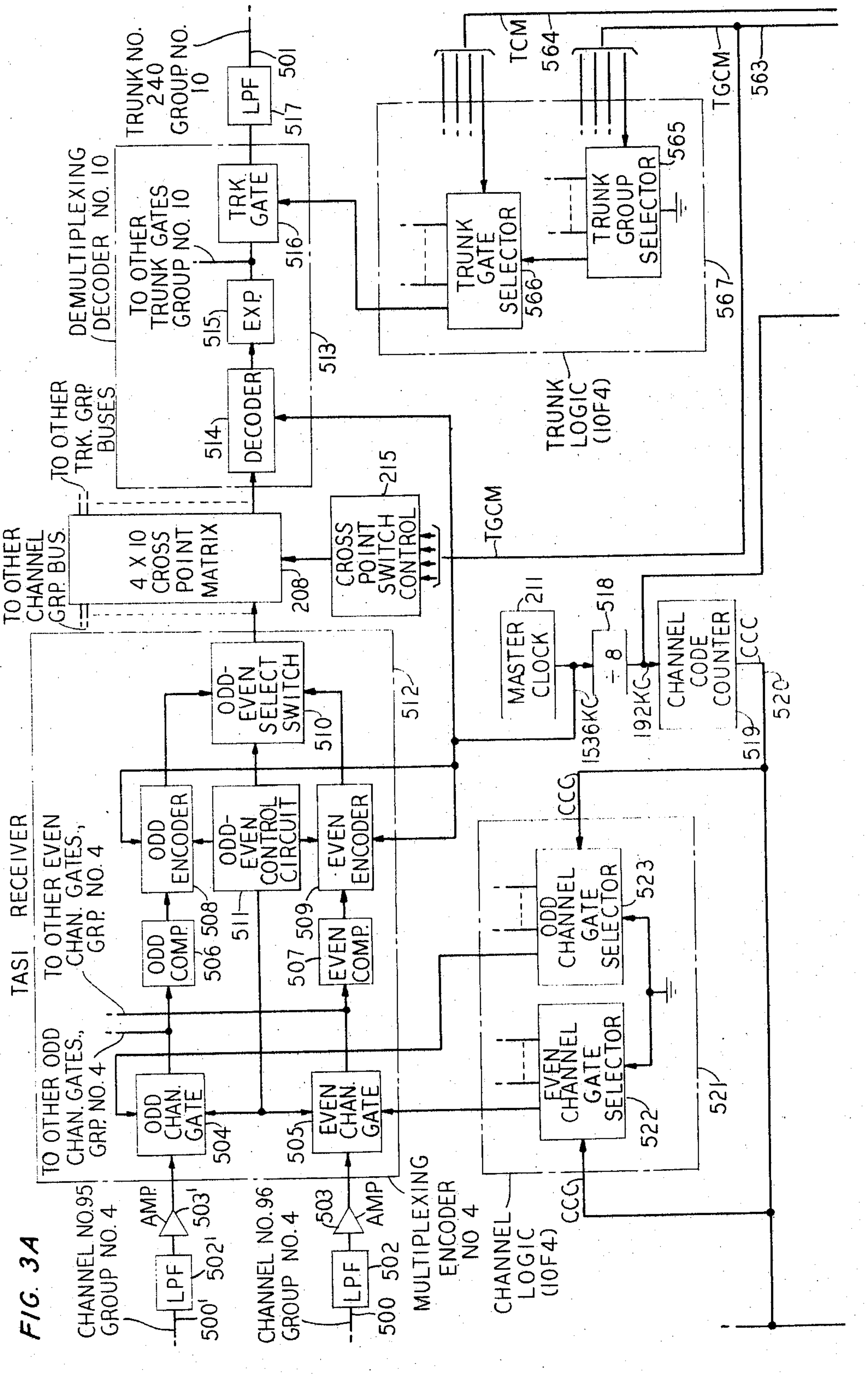
Figure 3B:
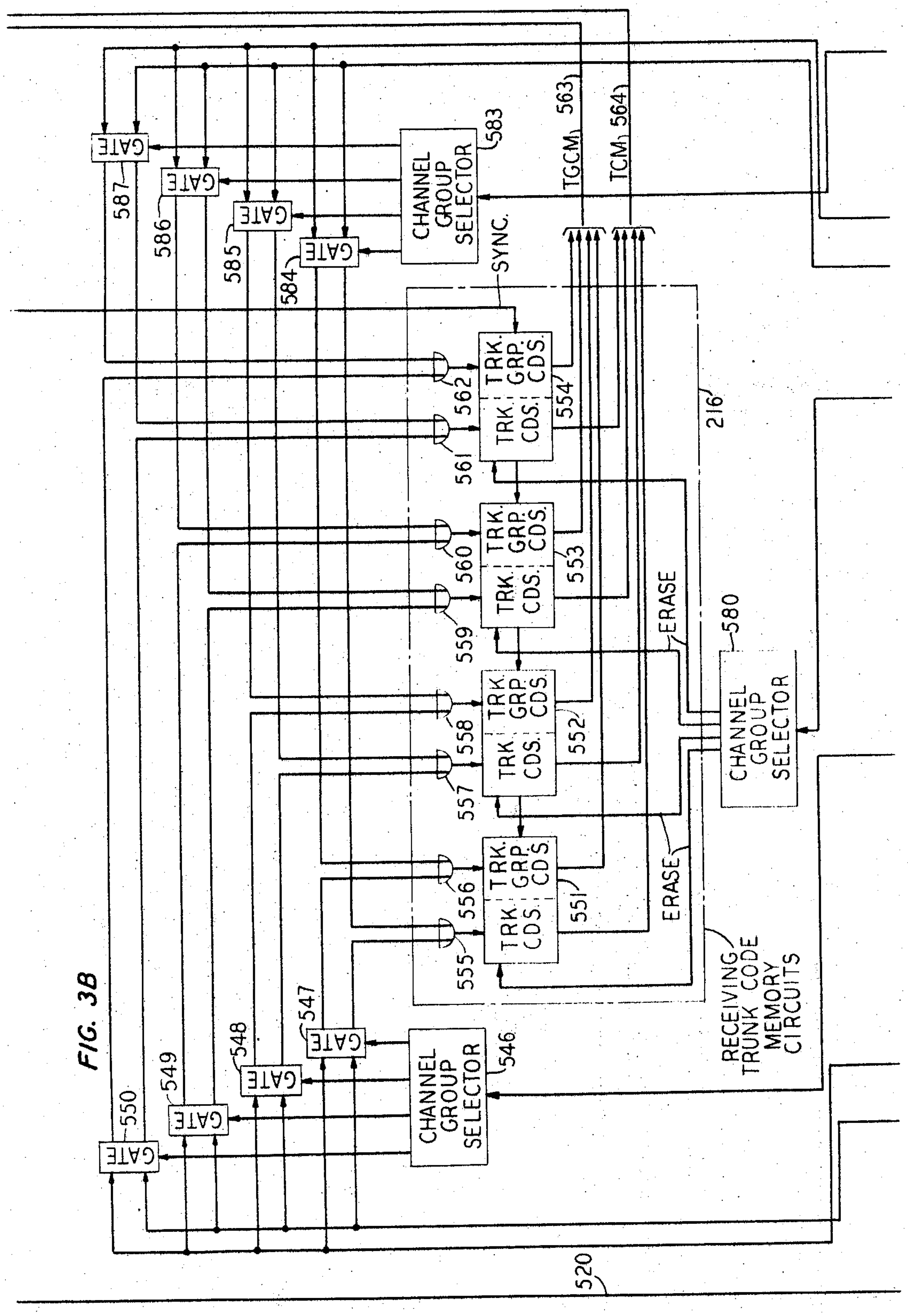
Figure 3C:
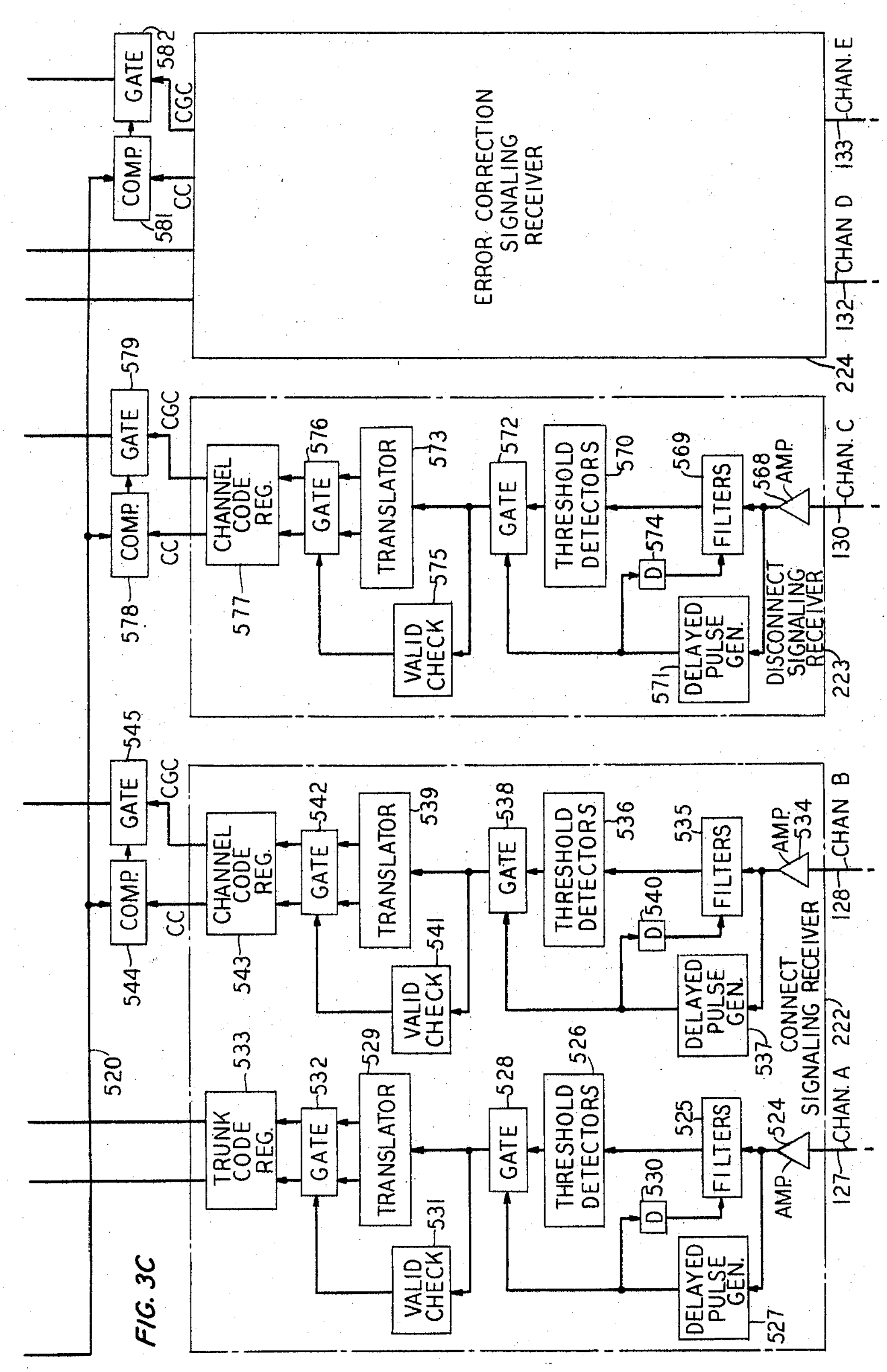
Figure 4C:
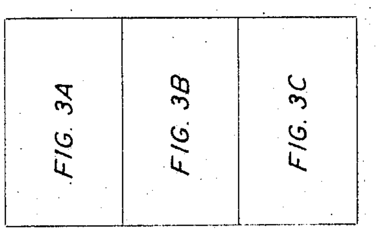
Figure 4B:
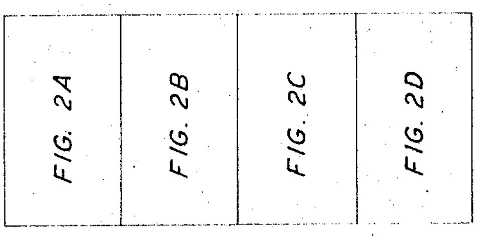

4A, show a general block diagram of a time assignment speech interpolation system in accordance with the present invention;

FIGS. 2A, 2B, 2C, and 2D, when arranged as shown in FIG. 4B, disclose a detailed block diagram of the time assignment speech interpolation transmitter shown in general form in FIG. 1A; and FIGS. 3A, 3B, and 3C, when arranged as shown in FIG. 4C, disclose a detailed block diagram of the time assignment speech interpolation receiver shown in general form in FIG. 1B.

*General description*

Figure 4A:
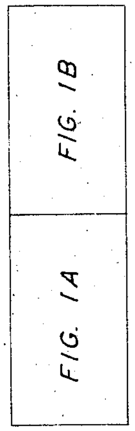

Referring more particularly to FIGS. 1A and 1B, when arranged as shown in FIG. 4A, they comprise a general block diagram of a time assignment speech interpolation system in accordance with the present invention. FIG. 1A shows the transmitting portion of the TASI system while FIG. 1B discloses the receiving portion.

Referring then to FIG. 1A, there is shown a TASI transmitter comprising a plurality of input telephone trunks 100 and a lesser plurality of transmission channels 101. As is well known, the TASI transmission facilities operate to transmit the speech from the larger plurality 100 of telephone trunks to the smaller plurality 101 of transmission channels by interpolating the speech of various talkers on the transmission channels only when each talker is actively engaged in uttering speech. To this end, each of the input trunks 100 is connected to a corresponding speech detector in the bank of speech detectors 102. Each speech detector is essentially a threshold device arranged to produce an output only during those times at which the signal level on the corresponding trunk is above some minimum value.

Scanner 103 looks sequentially at the outputs of all the speech detectors in order to ascertain the pattern of speech activity for the corresponding trunks. The output of scanner 103 is applied to trunk identity code generator 104 which, in response to each active speech detector scanned by scanner 103, generates a binary code representing the identity of the active talker. It will be noted that scanner 103 and trunk identity code generator 104 are under the control of trunk clock 105, which in turn, is driven by master clock 106.

The output of trunk identity code generator 104 is registered in queue register 107 which serves to queue the binary coded identities of active talkers in the order in which they are generated. Queue register 107 therefore has a capacity for storing a plurality of such binary coded identities and further includes means for advancing the codes stored therein in serial order. The output of queue register 107 is applied to the memory circuits 108.

The memory circuits 108 contain all the information necessary to connect each active telephone trunk to an available transmission channel. In particular, memory circuits 108 are divided into a plurality of individual memory modules each of which independently controls a group of such trunk-channel connections. The specific implementation of memory circuits 108 will be discussed in greater detail in connection with FIG. 2.

It should be noted that memory circuits 108 are under the control of channel clock 109, which, in turn, is under the control of master clock 106. Although trunk clock 105 and channel clock 109 are driven by the same master clock 106, it is not essential to the operation of the present invention that trunk scanning and channel switching be carried on in synchronism. Indeed, the channel switching must take place at 125 microsecond intervals to insure the transmission of speech without undue distortion. The trunk scanning, on the other hand, need only be carried on at a sufficiently rapid rate to insure that active trunks obtain service within a reasonable length of time. Successive scans of each of the telephone trunks 100 may therefore take place at one-half to one millisecond intervals.

In accordance with the present invention, the telephone trunks 100 are divided into a plurality of groups of trunks labeled in FIG. 1A as trunk groups No. 1 through No. *m*. All of the trunk groups include equal numbers of trunks and the trunks of each group are applied to one of multiplexing encoders 110, 111, . . . 112. Each of the multiplexing encoders 110 through 112 includes multiplexing gates for selectively connecting any one of the group of incoming trunks to a common bus which, in turn, is connected through an amplitude compression circuit to a pulse-code-modulation encoder. The pulse-code-modulation encoder serves to translate each amplitude sample delivered to it into a permutation-type binary pulse code having a sufficient number of digits to adequately represent the sample amplitude delivered to it. The pulse codes thus generated are delivered to respective ones of the trunk group buses 113, 114, . . . 115. As can be seen in FIG. 1A, the trunk sampling gates in multiplexing encoders 110 through 112 are under the control of trunk gate control circuit 116 which, in turn, responds to the trunk identity codes in memory circuits 108.

In further accord with the present invention, the trunk group buses 113 through 115 are connected to a crosspoint switching matrix 117. Matrix 117 comprises a simple crosspoint switch capable of connecting any one of the trunk group buses 113 through 115 to any one of the channel group buses 118, 119, . . . 120. Moreover, since the signals appearing on buses 113 through 115 are in the form of pulse groups, each of the crosspoint switches need comprise only a simple pulse transmission gate. Such gates are far simpler to construct and maintain than are crosspoint switches which are required to transmit analog signals without distortion. The crosspoint switching matrix 117 is under the control of crosspoint switch control circuit 121 which, in turn, is controlled by the trunk identity codes stored in memory circuits 108.

Each of the chanel group buses 118 through 120 is applied to a corresponding one of demultiplexing decoders 122, 123, . . . 124. Each of demultiplexing decoders 122 through 124 comprises means for decoding the pulse code arriving over one of the channel group buses 118 through 120. The demultiplexing decoders 122 through 124 further include an expanding circuit having a characteristic complementary to the compression circuits in multiplexing encoding circuits 110 through 112. Finally demultiplexing decoders 122 through 124 also include channel gates for connecting the expanded and decoded samples from channel group buses 118 through 120 to particular ones of the transmission channels 101. The transmission channels 101 are subdivided into channel groups identified in FIG. 1A as group Nos. 1 through *n* and the channels of each group are connected to a corresponding demultiplexing decoder. The demultiplexing decoders are under the control of channel gate control circuit 125 which, in turn, is under the control of the channel clock 109.

In general, the TASI transmitter of FIG. 1A operates as follows: Speech appearing on one of the telephone trunks 100 operates a corresponding speech detector in bank 102 which is detected by scanner 103 and utilized to generate a binary-coded identity of that telephone trunk in trunk identity code generator 104. The binary code thus generated is stored in queue register 107 until an available time slot comes up in the memory circuits 108. When such a time slot does become available, the identity code is transferred to the available time slot in memory circuits 108. Thereafter, the identity code in memory circuits 108 is read out in the same time slot in each recurring cycle of time slots. The identity code is applied to gate control circuit 116 to operate the appropriate trunk gate in the appropriate one of multiplexing encoders 110 through 112, thus connecting the active telephone trunk to one of the encoders, thereby encoding successive samples of this speech in a pulse code. The pulse code thus formed is delivered serially to the appropriate one of the trunk group buses 113 through 115, is switched in crosspoint matrix 117 to the appropriate channel group buses 118 through 120, and then delivered to the appropriate one of demultiplexing decoders 122 through 124.

It will be noted that the switching matrix 117 is also under the control of the memory circuits 108. When an active trunk identity code is assigned to memory circuits 108, it is assigned to a channel group as well as to a time slot. Thus, this information may be used to operate switching matrix 117 as well as the trunk gates in encoders 110 through 112.

The pulse codes delivered to demultiplexing decoders 122 through 124 are decoded and switched by means of channel gates to the appropriate one of channels 101. It will be noted that the channel gates are operated in regular succession under the control of channel clock 109. Moreover, the channel gates are operated in synchronism with the reading of trunk identity codes from memory circuits 108. Thus, at the time that a particular channel gate is being operated, the identity code of the telephone trunk assigned to that channel is read from the memory circuits 108 and utilized to operate the appropriate trunk gate. In this way, the trunk gates and channel gates are operated in pairs to provide effective communication between active telephone trunks and available transmission channels.

Pulse code modulation is utilized only for the purpose of providing noise-free crosspoint switching in matrix 117. In accordance with the present invention, the time division switching which takes place in the multiplexing encoders and decoders is designed to handle only that number of communication paths for which time division switches may be economically fabricated. In order to increase the capacity of the TASI transmitter of FIG. 1A, a plurality of such time division switches are utilized in parallel, each operating simultaneously, to service groups of trunks and groups of channels. An additional stage of space division switching, implemented by crosspoint switching matrix 117, is inserted between the time division switches and utilized to interconnect the time division buses of the individual time division switches.

In order to apprise the remote TASI receiver of the interconnections required to complete each communication path to the appropriate party at the remote receiver location, a system of multifrequency signals, transmitted over auxiliary transmission channels, is provided. Thus, connect signaling transmitter 126 transmits each trunk-channel assignment to the remote TASI receiver when that assignment is initially made. This information consists of the identity of the active telephone trunk and the identity of the assigned transmission channel. For convenience, the trunk identity may be transmitted over one control channel 127 and the identity of the assigned channel may be transmitted over a second control channel 128. Alternatively, these identity codes could be transmitted simultaneously or in series over a single control channel having adequate bandwidth.

Similarly, when it is necessary to disconnect a connect telephone trunk from the assigned transmission channel in the event that a speech activity has disappeared from that trunk and it is required for a different active trunk, a disconnect signaling transmitter 129 is utilized to transmit a coded identity of the transmission channel over which speech has heretofore been received.

Finally, in order to insure the correct operation of the remote TASI receiver, an error check signaling transmitter 131 is utilized to continuously transmit the current trunk-channel assignments to the remote TASI receiver. These assignments are then checked against the assignments previously made at the TASI receiver and used to correct erroneous assignments. For convenience, the trunk identity portion of the assignment may be transmitted over one control channel 132 and the channel identity portion of the assignment transmitted over a second control channel 133.

It can be seen that up to five control channels are reserved for control signaling, and hence may not be used for the transmission of speech. These five control channels, together with transmission channels 101 are applied to a multiplex transmitter 134 which serves to multiplex all of these channels in frequency and transmit them on a common transmission medium 135. Such a transmission medium may comprise, for example, a submarine cable system or a high frequency radio link in satellite communication system.

It should be further understood that the TASI transmitter of FIG. 1A and the TASI receiver of FIG. 1B provide for transmission in only one direction. For a complete two-way communication system, two transmitters and two receivers are required, a transmitter-receiver pair at each terminal. The two systems, however, are completely independent, and it is not necessary to assign channels in the two directions at the same time or to the same subscribers. Hybrid branching and combining arrangements are, of course, provided at each end to connect to two-wire telephone circuits.

Referring now to FIG. 1B, there is shown a general block diagram of a time assignment speech interpolation receiver in accordance with the present invention. In FIG. 1B, the transmission medium 135 from FIG. 1A is connected to a multiplex receiver 200 which receives all the signals transmitted on medium 135 and separates out the various speech and control channels by frequency demultiplexing techniques.

The speech channels 201 are divided into groups of channels corresponding to the channel groups into which channels 101 are divided in FIG. 1A. Each channel group is applied to one of multiplexing encoders 202, 203, . . . 204 which may be substantially identical to the multiplexing encoders 110 through 112 in FIG. 1A. Multiplexing encoders 202 through 204 include channel gates for multiplexing the signals on the channels of the corresponding channel group onto a common time divided bus. Inserted in this bus is an amplitude compression circuit and a pulse-code-modulation encoder. The output of multiplexing encoders 202 through 204 appear on channel group buses 205, 206 and 207, respectively, and are applied to a crosspoint switching matrix 208.

The channel gates in multiplexing encoders 202 through 204 are under the control of channel gate control circuit 209 which, in turn, is controlled by channel clock 210 driven by master clock 211. Thus, the channel gates in multiplexing encoders 202 through 204 are operated in regular succession under the control of clock signals.

The crosspoint switching matrix 208 may be identical to switching matrix 117 of FIG. 1A and comprises a crosspoint switch for connecting any one of the channel group buses 205 through 207 to any one of a plurality of trunk group buses 212, 213, . . . 214. The individual crosspoint switches may comprise simple pulse gates since only pulse-type signals are transmitted through the crosspoint switch. Switching matrix 208 is under the control of crosspoint switch control circuit 215 which, in turn, is under the control of the receiver memory circuits 216.

Trunk group buses 212 through 214 are connected to corresponding demultiplexing decoders 217, 218, . . . 219, which may be substantially identical to the demultiplexing decoders 122 through 124 in FIG. 1A. Each demultiplexing decoder includes a pulse-code-modulation decoder, an amplitude expanding circuit having a characteristic complementary to the compression circuit in the multiplexing encoders 202 through 204, and a plurality of trunk gates for selectively connecting the decoded and expanded outputs from the common bus to any one of the telephone trunks 220 in the corresponding trunk group. The trunk gates in demultiplexing decoders 217 through 219 are under the control of trunk gate control circuit 221 which, in turn, is controlled by memory circuits 216.

The TASI receiver of FIG. 1B operates in a manner similar to the TASI transmitter of FIG. 1A. In particular, trunk-channel assignments are stored in memory circuits 216 in the form of a trunk identity code registered in the time slot assigned to a particular transmission channel. Memory circuits 216 and the channel gates in multiplexing encoders 202 through 204 are under the control of the channel clock 210 and hence are always in synchronism. In the time slot in which a particular transmission channel gate is operated, the identity code of the assigned trunk is read from memory circuits 216 and used by way of trunk gate control circuit 221 to operate the trunk gate of the identified trunk in demultiplexing decoders 217 through 219. At the same time, assignments in memory circuits 216 also control crosspoint switching matrix 208 by way of crosspoint switch control circuit 215. In this way, a complete communication path is established through the TASI receiver of FIG. 1B from each transmission channel carrying speech to the assigned telephone trunk.

The trunk-channel assignments in memory circuits 216 are derived from connect signaling receiver 222 which, in turn, is connected to control channels 127 and 128. As was seen with reference to FIG. 1A, the trunk-channel assignments are transmitted over control channels 127 and 128 when such assignments are initially made. The multifrequency signals representing these assignments, which are transmitted by connect signaling transmitter 126 in FIG. 1A, are detected and decoded in connect signaling receiver 222 and utilized to insert the appropriate information into the memory circuits 216. Similarly, when it is necessary to disconnect a particular telephone trunk which was previously assigned to a transmission channel, a disconnect signal, in the form of a coded identity of the transmission channel to be disconnected, arrives over control channel 130. This disconnect signal is detected and decoded in disconnect signaling receiver 223 and is used to erase the trunk identity code previously stored in memory circuits 216 in the time slot assigned to the identified transmission channel.

Finally, the error check assignments arriving over control channels 132 and 133 are detected and decoded in error check receiver 224 and utilized to correct any erroneous assignments remaining in memory circuits 216.

In connection with FIGS. 1A and 1B, it should be noted that, for simplicity, the size of the trunk groups and the size of the channel groups are made the same. It is therefore possible to utilize standard pulse-code-modulation encoders and decoders in the circuits of FIGS. 1A and 1B. Since the number of trunks exceeds the number of transmission channels by a factor of from two to three, it is obvious that the number of channel groups is less than the number of trunk groups.

In the specific illustrative embodiment to be hereinafter described, it is assumed that the transmission medium 135 has a capacity of one hundred and one speech transmission channels, five of which are reserved for control signaling and the remaining ninety six of which are available for the transmission of speech. It has been determined that this number of transmission channels is adequate to handle the speech of two hundred and forty telephone trunks when that speech is interpolated as hereinbefore described.

Assuming the size of the trunk and channel groups to be twenty-four, there are thus provided ten trunk groups and four channel groups. There must, therefore, be provided ten multiplexing encoders 110 through 112 and ten demultiplexing decoders 217 through 219. Similarly, there must also be provided four multiplexing encoders 202 through 204 and four demultiplexing decoders 122 through 124. It is clear, however, that transmission facilities of greater or lesser capacity would require a larger or a smaller number of encoders and decoders. Indeed, one of the major advantages of the present invention is the modular construction of the trunk-channel groups and the memory circuits. The capacity of the system may be expanded, for example, simply by adding multiplexing encoders and decoders and memory modules.

*TASI transmitter*

Referring now to FIGS. 2A through 2D, when arranged as shown in FIG. 4B, there is shown a detailed schematic diagram of the TASI transmitter disclosed in general block form in FIG. 1A. As can be seen in FIG. 2A, only trunk No. 240 in group No. 10 is illustrated. This trunk is connected to a low-pass filter 300 which limits the frequency range of incoming speech signals to a range between zero and four thousand cycles per second. This band-limited signal is applied to speech amplifier 301 and thence to multiplexing encoder 302.

Multiplexing encoder 302 comprises a plurality of gating circuits, an amplitude compression circuit and an encoder circuit. Only one set of gates has been illustrated in FIG. 2A and comprises an odd trunk gate 303 and an even trunk gate 304 to which the output of amplifier 301 is connected. The output of odd trunk gate 303 is connected to odd compression circuit 305 while the output of even trunk gate 304 is connected to even compression circuit 306. The output of odd compression circuit 305 is connected to odd encoder 307 and the output of even compression circuit 306 is connected to even encoder 308. The encoders 307 and 308 may comprise any pulse code modulation encoder known in the art which encodes amplitude samples of speech signals into, preferably, an eight-bit binary code.

It is assumed that the encoder circuits utilized in the TASI transmitter of FIG. 2A are not sufficiently fast-acting to completely encode a pulse sample and reset in the time available between the delivery of successive pulse amplitude modulated samples. Since there are twenty-four telephone trunks in each trunk group, and since each trunk must be sampled and encoder once every 125 microseconds, a total of twenty-four code groups must be generated in each 125 microsecond cycle. This provides only 5.2 microseconds for each code group. In order to ease the design requirements of these encoders, two such encoders are provided for each trunk group and these encoders are operated alternately. This, during odd numbered time slots, the odd trunk gates corresponding to odd trunk gates 303 are operated and the odd numbered samples are encoder by odd encoder 307. During even numbered time slots, the even trunk gates corresponding to even trunk gate 304 are operated and the even numbered samples encoder in even encoder 308. An odd-even control circuit 309 is provided to control the operation of the trunk gates and the encoders. An odd-even selector switch 310 is also provided to connect the appropriate one of encoders 307 or 308 to the trunk group bus 311.

As discussed in connection with FIG. 1A, the trunk group bus 311 is applied to one input of the crosspoint switching matrix 117. Switching matrix 177, in turn, is under the control of crosspoint switching control circuit 121. The output of matrix 117 comprises a plurality of channel group buses similar to channel group bus 312. As discussed in connection with FIG. 1A, crosspoint switch control circuit 121 selectively connects any one of the trunk group buses similar to trunk group bus 311 to any one of the channel group buses similar to channel group bus 312.

Channel group bus 312 is connected to demultiplexing decoder 313. Demultiplexing decoder 313 comprises a decoder circuit 314, an amplitude expansion circuit 315, and a plurality of channel gates similar to channel gate 316. Decoder 314 decodes each code group applied to it and supplies an amplitude modulated pulse sample to expansion circuit 315. The expanded amplitude modulated pulses are then applied to channel gates similar to channel gate 316. Finally, each channel gate is connected to a low-pass filter similar to low-pass filter 317. This low-pass filter removes the switching frequencies from the pulse train delivered to it and thus restores the signals to simple analog speech. This speech is transmitted on speech transmission channel 318 via frequency multiplexing equipment and a common transmission medium to the remote TASI receiving terminal.

In order to better understand the operation of the TASI transmitter of FIGS. 2A through 2D, a brief discussion of the master timing scheme is now in order. The entire TASI transmitter of FIGS. 2A through 2D is under the control of a master clock 319 which produces clock pulses at a rate of 1,536,000 pulses per second. These clock pulses are produced at the bit rate of the PCM codes generated for switching in crosspoint switching matrix 117. (.65 microsecond period). These pulses are applied to odd encoder 307, even encoder 308 and decoder 314 and are used to time the generation of each bit in the pulse codes.

The output of master clock 319 is also applied to a pulse dividing circuit 320 which divides this pulse train by a factor of four, thus producing at its output a pulse train at the rate of 384,000 pulses per second These pulses are applied to a binary counter 321, identified as the trunk code counter. Trunk code counter 321 is a five-digit binary counter which generates twenty-four trunk codes in succession, one every 2.6 microseconds. This cycle of trunk codes is repeated once every 62.5 microseconds. Thus counter 321 is arranged to recycle after the count of twenty-four.

The output of divider circuit 320 is applied to divider circuit 322 which divides the incoming pulse train by a factor of two and thus produces at its output a pulse train having a repetition rate of 192,000 pulses per second. These pulses are applied to channel code counter 323 which generates five-digit binary codes used to represent, in sequence, all of the transmission channels, such as channel 318, in each channel group. Chanel code counter 323 generates a new channel code once every 5.2 microseconds and recycles to generate a new series of channel codes after twenty-four channel codes, every 125 microseconds.

The output of divider circuit 322 is similarly applied to divider circuit 324 which divides the incoming pulse train by a factor of twelve to provide an output pulse train at a repetition rate of 16,000 pulses per second. These pulses are applied to trunk group code counter 325 which generates four-digit binary codes representing the identity of the ten trunk groups. Trunk group code counter 325 advances one each 62.5 microseconds and recycles every 625 microseconds after the count of ten.

It will be noted that trunk group code counter 325 advances one for each complete cycle to trunk code counter 321. Thus, trunk group code counter 325 successively produces at its output the identities of all ten of the trunk groups. While each such trunk group identity code is available at the output of counter 325, trunk code counter 321 cycles through the trunk identity codes for all of the twenty-four telephone trunks within each trunk group.

As previously noted, each telephone trunk is provided with a speech detector such as speech detector 326 which is utilized to determine when the signal level of the connected telephone trunk exceeds a predetermined threshold value. When such a value is exceeded, speech detector 326 provides a signal on its output lead indicative of speech activity. The output of speech detector 326, together with the outputs of all of the other speech detectors connected to trunk group No. 10, is applied to speech detector scanner 327. Scanner 327 operates under the control of trunk codes from trunk code counter 321 to connect, in succession, all of the connected speech detector output leads to its output lead. This output lead is connected to trunk group scanner 328. Like scanner 327, scanner 328 successively connects each of its ten input leads, supplied from the speech detector scanners of the ten trunk groups, to its output lead 329. Trunk group scanner 328 is under the control of trunk group codes supplied from trunk group code counter 325.

The pulse pattern appearing on lead 329 is a representation of the spech activity of all of the two hundred and forty telephone trunks connected to the TASI transmitter. Each trunk is assigned a time slot 2.6 microseconds long in a recurring cycle of two hundred and forty of such time slots. Each such cycle therefore extends over a period of 625 microseconds. Thus each speech detector is scanned once every 625 microseconds.

The talker activity pattern on lead 329 is applied to inhibit gate 330, the output of which is applied, via OR gate 426 and inhibit gate 427, to a delay line 331 having a delay precisely equal to the scanning cycle of 625 microseconds. The output of gate 330 is also applied to a third inhibit gate 332. Inhibit gates 330, 332, and 427 are of the type which permit the transmission of pulse information in the absence of disabling inputs to their inhibit terminals. The inhibit terminal of gate 330 is connected to lead 333 while the inhibit terminal of gate 332 is connected to the output of delay line 331. The output of gate 332 is applied to queue entry switch 334. The remaining input of OR gate 426 is connected to the output of delay line 331.

Assuming that gates 330 and 427 are not disabled, each pulse of the activity pattern applied to gate 330 by lead 329 is simultaneously launched on delay line 331 and applied to inhibit gate 332. Providing there is no output simultaneously available from delay line 331, gate 332 remains enabled and an operate pulse is delivered to queue entry switch 334. Queue entry switch 334 operates to transfer the identity codes then present at the outputs of trunk code counter 321 and trunk group code counter 325 to queue register 335. Since the pulse delivered to queue entry switch 334 is generated in response to a specific trunk code and trunk group code from counters 321 and 325, respectively, the identity of the active telephone trunk is therefore transferred into queue register 335.

On the succeeding scan cycles, the pulse delivered by lead 329 and passed through gate 330 is inhibited at gate 332 by the simultaneous appearance of a previous pulse from delay line 331. Thus only the first pulse for each active telephone trunk is allowed to operate a queue entry switch 334. A pulse continues to circulate in delay line 331 in this time slot until disabled by inhibit gate 427 as will be hereinafter described.

Queue register 335 is a multistage register capable of advancing the trunk identiy codes supplied to it, in the order in which they are received, to an output stage. When all of the stages of queue register 335 are occupied by trunk identity codes, a signal is supplied to lead 333 to inhibit gate 330 and thus prevent the application of anv further trunk identity codes to queue register 335.

Before proceeding with the description of the operation of the TASI transmitter, it is convenient to consider the organization of the transmitting trunk code memory circuits 108 shown in detail in FIGS. 2B and 2C. As can be seen in FIG. 2B, the storage portion of memory circuits 108 is divided into four separate memory modules 336, 337, 338, and 339. Since all of these modules are identical, only module 336 has been illustrated in detail. Memory module 336 comprises a circulating memory 340 having a capacity of twenty-four twelve-bit words. These twenty-four words, of course, correspond to the twenty-four transmitting channels in each channel group. Since four channel groups are provided, four memory modules 336 through 339 are required. Each circulating memory corresponding to memory 340 presents each twelve-bit word to the output circuits once every 125 microseconds.

The twelve bits of each code in memory 340 are divided into a five-bit trunk code, a four-bit trunk group code, and a three-bit status code. The trunk codes and trunk group codes are used to identify the appropriate trunks assigned to specific transmission channels. The status codes are utilized to maintain a current record of the condition of each transmission channel. Four such status codes are required for the operation of the system being described. These codes are as follows.

| Code: | Status |
|---|---|
| C ---- | Channel assigned, connect signaling in progress. |
| T ---- | Channel assigned, speech transmission in progress. |
| D ---- | Channel assigned, disconnect signaling in progress. |
| A ---- | Channel unassigned. |

These status codes are generated in status encoders similar to status encoder 341 in module 336, and are decoded in status decoders 342, 343, 344, and 345, one such decoder being supplied for each of memory modules 336 through 339.

Memory module 336 further includes a memory entry switch 346 which is utilized to gain access to the circulating memory 340. Memory entry switch 346 is under the control of logical AND gate 347 and is enabled when all of the inputs to AND gate 347 are simultaneously present.

A first input to AND gate 347 is supplied on lead 348 from gueue register 335. A signal on lead 348 indicates that a talker identity code is available in the output stage of queue register 335. That is, the longest active talker now requests assignment to a channel.

A second input to AND gate 347 is derived from status decoder 342 by way of lead 349 and indicates that the channel assigned to this time slot is available for assignment to a telephone trunk. The last input to AND gate 347 is supplied from a pulse distributor 350 on lead 351. Pulse distributor 350 obtains pulses from the output of divider circuit 322 (divided by two) and supplies these pulses at 5.2 microsecond intervals successively to output leads 351, 352, 353, and 354. Leads 352 through 354 are supplied to memory modules 336 through 339, respectively. These leads insure that each trunk identity code is registered in only one module.

When operated by the complete enablement of AND gate 347, memory entry switch 346 transfers a talker identity code from queue register 335 to circulating memory 340. Simultaneously, a signal is supplied from lead 348 to status encoder 341 to generate the "C" status code for "connect signaling." This code is inserted, along with the trunk identity code, in circulating memory 340. This status code continues to circulate in memory 340 with the same trunk identity code until changed.

The trunk code outputs from circulating memory 340, as well as the trunk code outputs for memory modules 337, 338, and 339, are applied by way of cable 355 to the even and odd trunk gate selectors such as selectors 356 and 357 in trunk group logic circuit 360 in FIG. 2A. Selectors 356 and 357 utilize the trunk codes from the memory circuits to select the appropriate trunk gates for operation. Similarly, the trunk group codes from circulating memory 340 as well as the trunk group codes from memory modules 337, 338, and 339 are applied via a cable 358 to trunk group selectors similar to trunk group selector 359 in trunk group logic circuit 360. It will be appreciated that three other trunk group logic circuits similar to trunk group logic circuit 360 are provided for each of the other three memory modules 337 through 339.

Each of the trunk group selectors similar to trunk group selector 359 selectively connects its single input lead to any one of ten output leads as identified by the trunk group code. Similarly, each of the even and odd trunk gate selectors similar to trunk gate selectors 356 and 357 selectively connects its single input lead to one of twenty-four output leads, depending on the trunk code supplied thereto.

In FIG. 2C, the outputs of status decoders 342 through 345 corresponding to the status "T" (channel assigned, speech transmission in progress) are applied by way of cable 361 to the single input lead of the corresponding trunk group selector similar to trunk group selector 359. Thus, each trunk gate is operated only when that telephone trunk is to be connected for speech transmission.

At the same time that the trunk gates are being operated as described above, the output codes from channel code counter 323 are applied by way of cable 362 to channel gate selectors similar to channel gate selector 363 in channel logic circuit 364. It will be appreciated that four such channel logic circuits including channel gate selectors are available, one for each of the four channel groups.

Channel gate selector 363 selectively connects the "T" status input lead from cable 361 to any one of twenty-four output leads connected to the individual channel gates. As can be seen in FIG. 2A, one of these output leads enables channel gate 316.

As can be seen from the above description, each of the memory modules 336 through 339 has a storage capacity of twenty-four trunk identity codes. These twenty-four identity codes are successively read from the memory modules in synchronism with the operation of the channel gates in the corresponding channel groups. The trunk identity codes thus read out operate the trunk gates of the trunks assigned to the channels utilizing the same time slots.

It will be appreciated that the four channel groups are utilized simultaneously, each under the control of a separate memory module. Thus, the first channel of all of the channel groups are enabled simultaneously and the assigned trunk gates operated by the associated memory modules. It is this simultaneous operation of the time division switches which permits the increased capacity of the TASI system of the present invention without increasing the time division switching rate.

In order to complete the transmission path between trunks and channels, the trunk group codes on cable 358 are also applied to crosspoint switch control circuit 121. The channel group bus to be connected by matrix 117 is determined by which of the four memory modules supplies the trunk group code. The trunk group bus to be connected to that channel group bus is ascertained by decoding the trunk group code received over cable 358. It is apparent that four crosspoints are enabled simultaneously, one for each channel group and each one under the control of one of the memory modules.

In order to better understand the multifrequency signaling arrangements required to maintain the TASI transmitter and the TASI receiver in step, it is convenient to describe the process for establishing a single connection through the TASI transmitter. Thus, the appearance of a speech signal on trunk No. 240, illustrated in FIG. 2A, causes speech detector 326 to produce an output which, on the next speech detector scan cycle, is applied to lead 329 to enable queue entry switch 334 and transfer the trunk and trunk group codes from counters 321 and 325 to queue register 335. When this code is advanced to the last state of queue register 335, it is transferred to that memory module having the first available time slot. As previously described, the availability of a time slot is determined by the presence of the "A" status code in the status portion of circulating memory 340.

Assuming that memory module 336 first provides an available time slot, the "A" output lead 349 of status decoder 342 is energized to complete the enablement of AND gate 347 thus to operate memory entry switch 346 and transfer the identity code of trunk No. 240 (group 10) to circulating memory 340. At this time slot in each cycle thereafter, the trunk code and trunk group code of trunk No. 240 are supplied to cables 355 and 358, respectively.

When memory entry switch 346 is operated, the signal on lead 348 is applied to status encoder 341 to generate the "C" status code which is stored in circulating memory 340 in the same time slot as the talker identity code. On every cycle of memory 340 thereafter, this code is applied to status decoder 342 which, in turn, provides an output on lead 365. The output on lead 365 is applied by way of cable 366 to connect signaling transmitter 126 in FIG. 2D. At the same time, the trunk identity code on cables 355 and 358 are also supplied to connect signaling transmitter 126.

Assuming that connect signaling transmitter 126 is not presently being used for connect signaling by another trunk, the "C" status signal is transmitted through disable gate 367 by way of logical OR gate 368. The output of gate 367, together with the "C" status signal, complete the enablement of AND gate 369 to operate entry gate 370. Entry gate 370 passes the trunk code on cable 355 and the trunk group code on cable 358 to trunk code register 371. It will be noted that four separate entry gates, similar to entry gate 370, are provided, one for each memory module. The outputs of these gates are supplied to OR gates 433 and 434 and thence to register 371.

At the same time, the "C" status signal is translated into a channel group code by channel group code translator 372. Since only four channel groups are involved, each of the four "C" status inputs to translator 372 provides one of the four possible channel group codes. When operated, entry gate 370 therefore transfers the channel code from cable 362 and the channel group code from translator 372 to channel code register 373.

It will be appreciated that the trunk identity code now registered in trunk code register 371 is the identity code of the active trunk No. 240. The channel identity code now stored in channel code register 373 is the identity code of the channel to which active trunk No. 240 has been assigned. This association of trunk identity codes and channel identity codes is maintained by the timing arrangments in virtue of which the channel code is generated by counter 323 in synchronism with the reading of the trunk identity code assigned to that channel from the memory circuits 108.

The output of disable gate 367 is also applied to timer circuit 374 which generates, on output lead 375, an enabling signal having a duration equal to the desired duration of the connect signal. It has been determined that, in order to insure current reception of the multifrequency codes at the remote TASI receiver, a signal duration of between ten and fifteen milliseconds is required. This timing is supplied by the output on lead 375.

Lead 375 is supplied to transmit gate 376 to transfer the trunk and channel identity codes from registers 371 and 373 to multifrequency signaling circuits 377 and 378, respectively. Signaling circuits 377 and 378 translate the binary pulse input codes into multifrequency codes suitable for transmission over speech transmission channels. These multifrequency codes are applied to control channels 127 and 128, respectively. It will be noted that the output of timer circuit 374 on lead 375 is also used to disable gate 367, and thus prevent the initiation of a new connect signaling cycle before the previous one is completed.

Timer circuit 374 also provides a pulse on output lead 379 at the end of the timing interval. This pulse is short in duration in comparison to the signaling interval, and yet overlaps at least one complete readout cycle of the memory modules (on the order of one millisecond). This signal is applied as one input to AND gate 380. The other input to AND gate 380 is supplied from a comparison circuit 381 which provides a bit-by-bit comparison of the channel code stored in register 373 and the channel codes being received by way of cable 362 from channel code counter 323. Comparison circuit 381 will therefore provide an output to AND gate 380 in that time slot assigned to the channel identified in register 373.

When thus fully enabled, AND gate 380 delivers an enabling pulse to gate 382 to transfer the channel group code from register 373 to channel group translator 383. Translator 383 translates the channel group code into a signal on one out of four output leads which are applied by way of cable 384 to a status encoder similar to status encoder 341 in one of memory modules 336 through 339. Since memory module 336 is being utilized for this particular connection, the "T" status input of encoder 341 is energized to launch the "T" status code in the status portion of circulating memory 340. This new status code replaces the "C" status code previously circulating in memory 340 and appears in the same time slot as the previous "C" status code. As previously described, the "T" status code completes the enablement of trunk gates and channel gates by way of selectors 356, 357, 359, and 363 to permit the actual connection of the active trunk to the available channel.

In order to prevent the unnecessary disconnection and reconnection of telephone trunks when a speech fragment terminates and before the next speech fragment begins, the TASI system of the present invention operates on the so-called "seize and hold" principle. That is, once an active trunk has been assigned a transmission channel, the trunk retains the use of that channel even after speech has terminated, until a channel is required by some other trunk and no channels are currently available.

To this end, a counter circuit 385 is provided to count the "A" status outputs from status decoders 342 through 345. Counter 385 is recycled for each cycle of memory modules 336 through 339 and thus, in each memory cycle, provides an indication of the total number of available channels in all four channel groups. The output of counter 385 is applied to minimum threshold detector 386 which detects when the count in counter 385 falls below some preselected minimum level. Threshold detector 386 is sufficiently slower acting than counter 385 so that a number of cycles from counter 385 are required before detector 386 provides an output. The output of detector 386 is used to temporarily disable counter 385 and thus permit the required disconnection to take place before again detecting the minimum number of available channels.

The output of threshold detector 386 is applied as one input to each of gates 387, 388, 389 and 390. Another input to gates 387 through 390 is supplied from the corresponding "T" status output from decoders 342 through 345, respectively. Each of gates 387 through 390 also has a disable input to which there is connected by way of cable 391, one of the four outputs from four speech detector group selectors similar to speech detector group selector 392 in trunk group logic circuit 360. Speech detector group selector 392 receives its inputs from ten speech detector selectors similar to speech detector selector 393 which, in turn, are supplied with the outputs of all of the speech detectors of the corresponding group such as speech detector 326 for group No. 10. Speech detector selector 393 is under the control of the trunk codes on cable 355 from the memory modules 336 through 339. Similarly, speech detector group selector 393 is under the control of trunk group codes on cable 358 from the memory modules. Thus, selectors 392 and 393 provide on cable 391 the activity pattern for only the assigned trunks, in contrast to the active pattern on lead trunk 329 for all of the trunks.

Returning to FIG. 2C, it can be seen that each of gates 387 through 390 is fully enabled only when a sufficient number of channels is not available to meet currently expected needs (as determined by the threshold detector 386), when the corresponding channel is being connected to a trunk (as determined by the "T" status output of decoders 342 through 345), and when the previously assigned trunk no longer carries speech signals (as determined by the output of the speech detectors on cable 391).

Considering now only memory module 336, the output of gate 387 is applied to the "D" status input of encoder 341 and thereby causes the storage of the "D" status code in that time slot in circulating memory 340. The "D" status code is decoded by status decoder 342 and applied by way of cable 394 to disconnect signaling transmitter 129. This status signal is applied by way of OR gate 395 and disable gate 396 to timer circuit 397 which may be identical to timer circuit 374 in connect signaling transmitter 126.

The output of gate 396 is also supplied to AND gate 398 which is fully enabled by the "D" status signal from cable 394 to operate entry gate 399. Gate 399 transfers the channel code from cable 362 and the channel group code from channel group translator 400 to channel code register 401, where these codes are stored. It will be appreciated that the channel identity code now stored in channel code register 401 identifies the channel which is to be disconnected from a previously assigned telephone trunk.

The output of AND gate 398 is also applied, by way of cable 428 to one of four gates similar to gate 429 (FIG. 2A) to transfer the trunk identity code then present on cables 355 and 358 to disconnect trunk code register 430. The trunk code thus registered in register 430 is the identity code for the trunk to be disconnected. This code is applied to comparison circuit 431 to which there is also applied the trunk identity codes from counter 321 and 325. When these codes are identical, comparison circuit 431 supplies a signal to the inhibit input of gate 427 thereby terminating the circulation of the activity pulse for this trunk in delay line 331. The circuits are now free to initiate a new connection if and when the trunk again carries speech signals. The output of comparison circuit 431 also resets register 430 to prevent further inhibition of gate 427.

Returning to FIG. 2D, timer circuit 397 provides an output signal on lead 402 which operates transmit gate 403 for the duration of the disconnect signal. Gate 403 transfers the channel identity code from register 401 to the multifrequency signaling circuit 404 which, in turn, transmits a multifrequency code identifying that channel over control channel 130.

At the end of the signaling interval, timer circuit 397 produces an output on lead 405 to AND gate 406. The other input for AND gate 406 is derived from comparison circuit 407 when one of the output codes from channel code counter 323 on bus 362 is identical to the channel code stored in channel code register 401. When thus enabled, AND gate 406 operates gate 408 to transfer the channel group code from register 401 to channel group code translator 409. Channel group code translator 409 translates the channel group code into a signal on one out of four output leads which signal is transmitted over cable 410 to the status encoders similar to status encoder 341 in memory modules 336 through 339. This signal is applied to the "A" status input of the status encoder 341 to write the "A" status code in the status portion of circulating memory 340, thus replacing the "D" status code previously stored. This time slot is now marked as available and may be used by a newly active telephone trunk for connection to the corresponding transmission channel.

It will be appreciated that the proper operation of the TASI system of the present invention depends to a very large degree on the duplication of the trunk-channel assignments at the remote TASI receiver. Should any of these assignments be incorrectly received at the TASI receiver, the following speech fragments will be delivered to an incorrect party. The interpolation of incorrect speech fragments in the speech of the talking party results in garbling of the speech. In order to insure the correct assignment of trunks and channels at the receiver, an error correction signaling transmitter 131 is provided to continuously transmit, in succession, all of the trunk channel assignments current at the TASI transmitter. Since each assignment requires 10 to 15 milliseconds for its transmission, any incorrect assignments existing at the TASI receiver may therefore be corrected within a period of one to one and one-half seconds after it occurs. The majority of such errors, of course, will be corrected in less than one second.

Turning then to the error correction signaling transmitter 131 in FIG. 2D, it will be assumed that the free-running timer circuit 411 produced, at the end of the previous timing interval, a signal on output lead 412 which advances counter 415 and is also applied to AND gate 413. The other input to AND gate 413 is supplied from a comparison circuit 414 which compares the channel code supplied by channel code counter 415 and the channel codes produced by channel code counter 323 on cable 362. When these codes are identical, AND gate 413 is fully enabled to operate gate 416 and apply the channel group code appearing on the output of channel group code counter 417 to channel group code translator 418. Translator 418 translates the channel group code into a signal on one out of four output leads which are applied to AND gates similar to AND gate 419. The other input to AND gate 419 is supplied by lead 412 from timer circuit 411. When thus fully enabled, AND gate 419 operates entry gate 420 to transfer the trunk identity code from the corresponding memory module, by way of cables 355 and 358, to trunk code register 421. At the same time, the output from timer circuit 411 on lead 412 also advances the channel code counter 415 by one count.

Thereafter, timer circuit 411 provides a transmit signal on output lead 422 to operate transmit gate 423 and transfer the trunk identity code from register 421 to multifrequency signaling circuit 424 and to transfer the channel code from channel code counter 415 and the channel group code from channel group code counter 417 to multifrequency signaling circuit 425. The multifrequency signaling circuits 424 and 425 transmit the trunk-channel assignments by way of control channels 132 and 133 respectively.

It can be seen that channel code counter 415 proceeds through all of the channel codes in sequence. Channel group code counter 417 is arranged to be advanced one for each full cycle of operation of channel code counter 415. In this way, assignments to all the transmission channels are transmitted in regular sequence on control channels 132 and 133.

*TASI receiver*

FIGS 3A through 3C, when arranged as shown in FIG. 4C, show a detailed schematic block diagram of a time assignment speech interpolation receiver in accordance with the present invention. The elements shown in FIGS. 3A through 3C which correspond to elements shown in FIG. 1B are identified by the same reference numerals.

Only communication channels 500 and 500' and single telephone trunk 501, together with the associated switching and control equipment, are shown in detail in FIG. 3A. The remainder of the channels and trunks may be assumed to be substantially identical and under the control of similar control circuitry.

Channel 500 is connected to a low-pass filter 502 which limits the voice signals applied thereto to a frequency range between zero and 4,000 cycles per second. These band-limited voice signals are applied through a voice amplifier 503 to even channel gate 505. Similarly, channel 500' is connected to low-pass filter 502', amplifier 503' and odd channel gate 504. The output of odd channel gate 504 is applied to odd compressor circuit 506 while the output of even channel gate 505 is applied to even compressor circuit 507. The output of odd compressor circuit 506, in turn, is applied to odd encoder 508 while the output of even compressor 507 is applied to even encoder 509. Two encoders are supplied for each transmission channel group to provide additional time for the encoding of each speech sample. Odd-numbered channels are connected to odd encoder 508 while even-numbered channels are connected to even encoder 509.

An odd-even selector switch 510 is provided to alternately select the outputs of the two encoders 508 and 509. An odd-even control circuit 511 is also provided to alternately select the odd and even channel gates and encoders.

Multiplexing encoder 512, of course, includes alternating odd and even channel gates for the remaining twenty-three transmission channels in channel group No. 4. In addition, three other multiplexing encoders similar to multiplexing encoder 512 are provided for the three other channel groups. The output of odd-even selector switch 510 is applied to crosspoint switching matrix 208 along with channel group buses from each of the other multiplexing encoders. Matrix 208 supplies ten trunk group buses to demultiplexing decoders similar to demultiplexing decoder 513. Matrix 208 is arranged to connect any one of the four input channel group buses to any one of the ten output trunk group buses by means of individual switching circuits at each of the crosspoints. Since pulse-coded signals are the only signals which need be transmitted through crosspoint switch 208, the switches at these crosspoints need only be simple pulse gates. Crosspoint switching matrix 208 is under the control of crosspoint switch control circuit 215 which selectively connects the four channel group buses to four of the ten trunk group buses during the period of each pulse code group.

The demultiplexing decoder 513 includes decoder circuit 514, suitable for decoding the pulse code groups generated by encoders 508 and 509. The amplitude samples supplied by decoder 514 are applied to amplitude expansion circuit 515 having a characteristic complementary to the compression characteristic of compressor circuits 506 and 507. The decoded and expanded outputs from expansion circuit 515 are applied to a bank of trunk gates similar to trunk gate 516 which selectively connect each amplitude sample to any one of twenty-four telephone trunks similar to telephone trunk 501 by way of low-pass filter circuit 517. Filter 517 serves to remove the switching frequencies from the signals delivered to it and supplies to telephone trunk 501 a replica of the voice frequency signals transmitted over one of the transmission channels.

The entire TASI receiver of FIGS. 3A through 3C is under the control of master clock circuit 211 which supplies pulses at a rate of 1,536,000 pulses per second to encoder circuits 508 and 509 and to decoder circuit 514. This is the basic pulse repetition rate of the pulse code groups switched in switching matrix 208.

It is to be noted that, although master clock 211 in FIG. 3A has the same nominal repetition rate as master clock 319 in FIG. 2A, it is not necessary that these clocks be synchronized. This is true because signals transmitted from the TASI transmitter are reconstructed as analog speech signals before transmission on the transmission channels.

The output of master clock 211 is applied to pulse divider circuit 518 which divides the output from clock 211 by a factor of eight and supplies pulses at repetition rate of 192,000 pulses per second to channel code counter 519. Channel code counter 519 supplies the twenty-four channel codes for each channel group in succession on output cable 520. These output codes are supplied simultaneously to a plurality of channel logic circuits similar to channel logic circuit 521. Channel logic circuit 521 operates to control the channel gates in multiplexing encoder 512 for channel group No. 4. Similar channel logic circuits are provided for controlling the channel gates in multiplexing encoders Nos. 1, 2, and 3, not shown.

Channel logic circuit 521 includes an even channel gate selector 522 and an odd channel gate selector 523. These channel gate selectors 522 and 523 are under the control of channel codes from counter 519 and operates to sequentially enable the odd and even channel gates, similar to channel gates 504 and 505, in the multiplexing encoder 512. Since these selectors are under the control of a counter, the channel gates are continuously operated in regular succession to provide samples from each of the transmission channels to the respective encoders. A complete transmission path through the TASI receiver of FIG. 3A, however, is not provided until the corresponding trunk gates, similar to trunk gate 516, are enabled. These are enabled by trunk identity codes stored in receiving trunk code memory circuits 216 as will be hereinafter described.

Assuming that the remote TASI transmitter has detected speech activity on one of the incoming telephone trunks, and has generated a connect signal identifying both the trunk and the transmission channel assigned to it, this connect signal is received by connect signaling receiver 222 in the form of multifrequency codes transmitted over control channels 127 and 128 (FIG. 3C). The multifrequency signal received over control channel 127 represents the trunk identity code and is delivered by way of signaling amplifier 524 to a bank of filter circuits 525. Filter circuits 525 include the filters necessary to separate all of the frequency components of the multifrequency code and deliver these frequency separated signals to a bank of threshold detector circuits 526. The outputs of the threshold detectors 526 corresponding to the frequency components present in the received multifrequency codes are available to identify the corresponding telephone trunk.

The output of amplifier circuit 524 is simultaneously applied to delayed pulse generator 527 which detects the presence of a multifrequency signaling code and generates a pulse at a fixed time thereafter, for example, approximately ten milliseconds. This delay allows the reactive elements in the filter circuit 525 to be charged by the input signals to a level adequate for accurate detection. The output of delayed pulse generator 527 is applied to gate circuit 528 to gate the outputs of the threshold detectors 526 to translator circuit 529. The output of delayed pulse generator 527 is further delayed for a brief interval in delay circuit 530 and applied to the filter circuit 525 to rapidly discharge the reactive elements in these filter circuits and thus prepare the filter circuits for the reception of the next multifrequency code.

Translator circuit 529 operates to translate the signals representing the multifrequency codes received over channel 127 into standard binary pulse codes used by the TASI transmitter to represent the telephone trunks. Gate circuit 528 also applies the multifrequency code signals to validity checking circuit 531 which checks these codes to ascertain if they are valid and allowable codes. To this end, the multifrequency codes used are preferably redundant codes having restrictive properties easily detected by validity checking circuit 531.

The output of validity checking circuit 531 operates gate 532 to transfer the trunk identity code from translator 529 to trunk code register 533. It will be appreciated that the trunk identity code now in register 533 includes a trunk code portion and a trunk group code portion, the former including five digits and the latter including four digits. This trunk identity code identifies the trunk assigned to the associated transmission channel, identified in a similar manner as will be hereinafter described.

At the same time that the trunk identity code is received over control channel 127, the channel identity code of the assigned transmission channel is received over control channel 128. This multifrequency code is applied by way of signaling amplifier 534 to filter circuits 535 where the frequency components of the received signals are separated. These frequency separated signals are detected by threshold detectors 536.

The output of amplifier 534 is simultaneously applied to delayed pulse generator 537 which generates a delayed pulse to be applied to gate circuit 538 and transfers the multifrequency code signals from threshold detectors 536 to translator 539. This pulse is further delayed in delay circuit 540 and utilized to discharge filter circuit 535. Translator 539 translates the multifrequency code into a standard binary code representing the identity of the assigned transmission channel. The multifrequency code is checked in validity checking circuit 541, the output of which operates gate 542 to transfer the channel identity code from translator 539 to channel code register 543. It will be appreciated that the channel identity code includes two portions, one representing the channel code within each channel group, and the other representing the channel group code.

The output of channel code counter 519 is applied by way of cable 520, to comparison circuit 544 to which the channel code portion of the code stored in register 543 is likewise applied. Comparison circuit 544 provides a bit-by-bit comparison of the two channel codes and, when they are identical, supplies an output to operate gate 545. Gate 545 transfers the channel group code portion of the code in register 543 to channel group selector 546 (FIG. 3B). Channel group selector 546 translates the channel group code into a signal on one of four output leads to gates 547 through 550, respectively. One of gates 547 through 550 operates to enter the trunk identity code in register 533 into one of the memory modules 551 through 554, respectively, in memory circuits 216 by way of logical OR gates 555 through 562.

It can be seen that the assignment of telephone trunks to transmission channels is duplicated at the TASI receiver by utilizing the channel code portion of the connect signal to identity the appropriate time slot in memory circuit 216 for the entry of the assigned trunk identity code. The channel group portion of the channel identity code is utilized to select one of four memory modules 551 through 554 corresponding to the four channel groups.

The outputs of memory modules 551 through 554 are applied by way of cables 563 and 564 to trunk group selector 565 (FIG. 3A) and trunk gate selector 566, respectively, in trunk logic circuit 567. Trunk group selector 565 operates to select the proper trunk group identified by the trunk group code appearing on the cable 563. Similarly, trunk gate selector 566 operates to select the appropriate trunk gate within the trunk group as identified by the trunk code on cable 564. The output of trunk gate selector 566 is applied to operate trunk gates similar to trunk gates 516 in FIG. 3A.

It can be seen that the trunk identity code now stored in receiving code memory circuits 216 may be utilized to complete the connection between the transmission channel and the telephone trunk which have ben assigned to each other at the remote TASI transmitter. As previously noted, the channel gates in each group are operated in regular succession under the control of the channel code counter 519. The readout of trunk identity codes from memory circuits 216 is synchronized with the operation of the channel gates to provide trunk identity codes in the assigned time slots, thus to operate the assigned trunk gates in the same time slot as the assigned channel gate.

Crosspoint switching matrix 208 is controlled by crosspoint switch control circuit 215 to complete the transmission paths between channels and trunks. Crosspoint switch control circuit 215 is under the control of the trunk group codes from memory circuits 216 on cable 563. Control circuit 215 simultaneously operates four crosspoint switches, one for each of the channel group buses. These channel group buses are connected to the trunk group buses identified by the trunk group codes arriving on cable 563. In this way, the communication path is completed from a transmission channel carrying speech signals to telephone trunk for which these speech signals are intended.

In order to disconnect a previously connected telephone trunk from the assigned transmission channel, the remote TASI transmitter transmits a disconnect signal on control channel 130 to disconnect signaling receiver 223. This disconnect signal is a multifrequency code representation of the channel from which the assigned trunk is to be disconnected. This multifrequency code is amplified by signaling amplifier 568 and applied to filter circuits 569 where the frequency components of the multifrequency signal are separated and applied to threshold detector 570. The output of amplifier 568 is also applied to delayed pulse generator 571 which, after sufficient delay to allow the signal level to build up in filter circuits 569, operates gate 572 to transfer the multifrequency signals from threshold detector 570 to translator 573. After a further brief delay in delay circuit 574, the output of pulse generator 571 is applied to discharge filter circuits 569.

Translator 573 translates the multifrequency code signals to standard binary pulse code signals representing the channel. The output of gate circuit 572 is also applied to validity checking circuit 575 which, after ascertaining validity of the received signal, operates gate 576 to transfer the output of translator 573 to channel code register 577. The channel code in register 577 comprises two portions, one representing the channel code with in a channel group and the other representing the channel group code.

The channel code from register 577 and the channel codes from counter 519 on cable 520 are supplied to comparison circuit 578. Comparison circuit 578 provides a bit-by-bit comparison of the two channel codes and produces an output to operate gate 579 when these codes are identical. Gate 579 operates to transfer the channel group code from register 577 to channel group selector 580 (FIG. 3B). Selector 580 translates the channel group code into a signal on one out of four output leads, each of which is applied to one of the memory modules 551 through 554. The outputs from selector 580 are utilized to erase from the memory modules the trunk identity code stored in that time slot. Thus, this time slot is made available for the writing of new trunk identity codes by way of connect signaling receiver 222 and gates 547 through 550.

As previously noted, in order to insure that the assignment of telephone trunks to transmission channels originally made at the remote TASI transmitter, are duplicated in the memory circuits 216 at the TASI receiver, error correction signals are regularly transmitted over control channels 132 and 133 to error correction receiver 224. Error correction receiver 224 may be identical to connect signaling receiver 222. That is, the trunk identity code received in multifrequency from over control channel 132 is detested, checked for validity, translated to binary code and stored in a trunk code register. Similarly, the channel identity code received over control channel 133 is likewise detected, checked for validity, translated to standard binary code, and stored in a channel code register. The channel code portion of the channel identity code received on control channel 133 is applied to comparison circuit 581 along with the channel codes supplied by channel code counter 519 on cable 520. When the two codes are identical, comparison circuit 581 provides a signal to operate gate 582 and transfer the channel group code from the channel code register in error correction signaling receiver 224 to channel group selector 583. Channel group selector 583 translates the channel group code into a signal on one of four output leads to operate one of gates 584 through 587. When operated, these gates transfer the trunk identity code from the trunk code register in error correction signaling receiver 224 to one of the memory modules 551 through 554 by way of OR gates 555 through 562. It can be seen that the trunk identity codes in memory circuit 216 are altered only if the error correction signals disagree with the previously stored connect signals.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A time assignment speech interpolation system comprising a plurality of speech trunks, a lesser plurality of communication channels, said trunks and channels being arranged in groups, speech detection means on said speech trunks, analog-to-digital translating means associated with each of said groups of speech trunks, digital-to-analog translating means associated with each of said groups of communication channels, means for assigning time slots in a recurring cycle of time slots to pairs of idle transmission channels and particular speech trunks only when said speech detection has occurred on said speech trunks, means for selectively connecting each particular speech trunk upon which said speech detection has occurred to the associated analog-to-digital translating means in its assigned time slot, means for selectively connecting each idle communication channel to the associated digital-to-analog translating means in its assigned time slot, and means for selectively interconnecting the outputs of said analog-to-digital translating means and the inputs of said digital-to-analog translating means.

2. The time assignment speech interpolation system according to claim 1 wherein said means for selectively interconnecting analog-to-digital and digital-to-analog translating means comprises a crosspoint switching matrix.

3. A time assignment speech interpolation system comprising spech detection means, a plurality of incoming time division switching means each selectively connecting any one of a group of speech sources having been detected as having speech thereon to a corresponding pulse code modulator, a lesser plurality of outgoing time division switching means each selectively connecting any one of a group of communication channels to a corresponding pulse code demodulator, and space division switching means for selectively interconnecting said modulators and demodulators.

4. The time assignment speech interpolation system according to claim 3 wherein each of said time division switching means comprises a common bus, means for assigning each speech source, when detected as having speech thereon, to a time slot in a recurring cycle of time slots, and means for selectively connecting each speech source to the corresponding common bus during the assigned time slot.

5. The time assignment speech interpolation system according to claim 3 wherein said space division switching means comprises a plurality of incoming buses connected to said pulse code modulators, a plurality of outgoing buses connected to said pulse code demodulators, a crosspoint switch for connecting each of said input buses to each of said output buses, and means for selectively enabling said switches.

6. A time assignment speech interpolation system comprising a plurality of pulse code modulators, a group of telephone trunks associated with each of said modulators speech detection means on said telephone trunks, incoming time division switching means for selectively connecting said telephone trunks to the associated modulator during recurrent time slots, a lesser plurality of pulse code demodulators, a group of transmission channels associated with each of said demodulators, outgoing time division switching means for selectively connecting each of said transmission channels to the associated demodulators during recurrent time slots, crosspoint switching means for selectively interconnecting said modulators and demodulators in pairs during recurrent time slots, and means for assigning each time slot in a recurring cycle of time slots to selected pairs of available transmission channels and telephone trunks upon which said speech detection has occurred.

7. The time assignment speech interpolation system according to claim 6 further including storage means, means for cyclically interrogating said storage means in synchronism with the connection of said transmission channels to said demodulators, means included in said assigning means for registering in said storage means the identity of telephone trunks upon which said speech detection has occurred, and means responsive to said interrogating means for operating said incoming time division switching means.

8. A time assignment signal interpolation system comprising a plurality of speech sources, a means for talkspurt detection on said speech sources, a lesser plurality of communication channels, a digital crosspoint switching network, a first subplurality of multiplex encoders for encoding speech from particular speech sources detected as having talkspurts thereon, means for multiplexing said encoded speech on one group of conductors of said switching network, a second subplurality lesser than said first subplurality of demultiplexing decoders for decoding said encoded speech on another group of conductors of said switching network and distributing said decoded speech to available ones of said communications channels, and means for maintaining assignments of idle communication channels to particular speech sources detected as having talkspurts thereon, said assignment maintenance means controlling the operation of said switching networks.

References Cited

UNITED STATES PATENTS

| | | |
|---|---|---|
| 2,935,569 | 5/1960 | Saal et al. |
| 2,957,946 | 10/1960 | Kolding et al. |
| 3,281,536 | 10/1960 | Dupieux et al. |
| 3,311,705 | 4/1967 | Le Corre et al. |

RALPH D. BLAKESLEE, *Primary Examiner.*